United States Patent
Kim et al.

(10) Patent No.: US 8,751,695 B2
(45) Date of Patent: Jun. 10, 2014

(54) HYBRID STORAGE DEVICE AND ELECTRONIC SYSTEM USING THE SAME

(75) Inventors: Tae-yung Kim, Hwaseong-si (KR);
Kyu-yeol Park, Seongnam-si (KR);
Byung-hoon Chung, Seoul (KR);
Jae-won You, Hwaseong-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 190 days.

(21) Appl. No.: 13/179,658

(22) Filed: Jul. 11, 2011

(65) Prior Publication Data
US 2012/0124266 A1    May 17, 2012

(30) Foreign Application Priority Data

Nov. 11, 2010 (KR) .................. 10-2010-0112107

(51) Int. Cl.
*G06F 3/00* (2006.01)
*G06F 1/00* (2006.01)

(52) U.S. Cl.
USPC .................................. 710/8; 710/62

(58) Field of Classification Search
USPC ............. 710/8, 10, 62, 72, 74; 713/147
See application file for complete search history.

(56) References Cited

U.S. PATENT DOCUMENTS

| | | | |
|---|---|---|---|
| 7,386,868 B2 * | 6/2008 | McCormack | 720/657 |
| 7,685,374 B2 * | 3/2010 | Diggs et al. | 711/151 |
| 7,822,917 B2 * | 10/2010 | Lodolo et al. | 711/112 |
| 8,239,581 B2 * | 8/2012 | Ibarra et al. | 710/2 |
| 8,250,266 B2 * | 8/2012 | Rugg et al. | 710/72 |
| 2003/0079066 A1 | 4/2003 | Pang | |
| 2005/0086434 A1 * | 4/2005 | Kang et al. | 711/115 |
| 2006/0230440 A1 * | 10/2006 | Wu et al. | 726/9 |
| 2007/0259569 A1 * | 11/2007 | Wang et al. | 439/638 |
| 2007/0260756 A1 * | 11/2007 | Tseng et al. | 710/5 |
| 2008/0082842 A1 * | 4/2008 | Minami | 713/300 |
| 2008/0162755 A1 * | 7/2008 | Minami | 710/74 |
| 2008/0189465 A1 * | 8/2008 | Yang | 710/316 |
| 2008/0288703 A1 | 11/2008 | Iyer | |
| 2009/0019301 A1 * | 1/2009 | Minami | 713/324 |
| 2009/0079264 A1 * | 3/2009 | Minami | 307/44 |
| 2009/0187779 A1 * | 7/2009 | Liu et al. | 713/323 |
| 2009/0210603 A1 * | 8/2009 | Chen et al. | 710/305 |
| 2009/0300269 A1 * | 12/2009 | Radke et al. | 711/103 |
| 2009/0313488 A1 * | 12/2009 | Lee | 713/300 |
| 2011/0167177 A1 * | 7/2011 | Kouyama et al. | 710/11 |
| 2012/0151576 A1 * | 6/2012 | Yuan et al. | 726/19 |
| 2012/0159208 A1 * | 6/2012 | Intrater | 713/320 |

FOREIGN PATENT DOCUMENTS

| | | |
|---|---|---|
| JP | 2008-192123 | 8/2008 |
| KR | 10-2007-0075442 A | 7/2007 |
| KR | 10-2009-0123674 | 12/2009 |
| KR | 10-2010-0057325 A | 5/2010 |

OTHER PUBLICATIONS

Korean Office Action issued on Jul. 10, 2013 in corresponding Korean application No. 10-2010-0112107 (5 pages, in Korean).

* cited by examiner

*Primary Examiner* — Christopher Shin
(74) *Attorney, Agent, or Firm* — NSIP Law

(57) ABSTRACT

A hybrid storage device is provided. The hybrid storage device includes a first storage part that comprises an interface device based on a first standard, a second storage part that comprises an interface device based on a second standard, and a connector for interface devices that is shared by the first storage part and the second storage part and comprises a plurality of pins.

17 Claims, 4 Drawing Sheets

HYBRID STORAGE DEVICE AND ELECTRONIC SYSTEM USING THE SAME

CROSS-REFERENCE TO RELATED PATENT APPLICATION

This application claims the benefit of Korean Patent Application No. 10-2010-0112107, filed on Nov. 11, 2010, in the Korean Intellectual Property Office, the entire disclosure of which is incorporated herein by reference for all purposes.

BACKGROUND OF THE INVENTION

1. Field of the Invention

The following description relates to a hybrid storage device, and an electronic system using the same 2. Description of the Related Art Devices having a serial advanced technology attachment (SATA) interface or a universal serial bus (USB) interface may use a port multiplier such as a hub to connect a plurality of slave devices to one host connector (port).

As the types of optical disc drives (ODDs), widely used storage devices, have been diversified, attempts have been made to couple other types of storage devices to an ODD that uses only an optical disc. An example of a non-optical storage device that may be coupled to an ODD includes a hard disc drive using a semiconductor storage magnetic disc such as a solid-state drive (SSD) or a flash memory. As is well known, in order to couple an ODD to another type of storage device, the ODD and the storage device may be physically coupled to each other via separate interfaces, or the ODD and the storage device may be physically and electrically coupled to each other by installing a port multiplier in the ODD.

One of the technical goals of a hybrid storage device obtained by installing a separate storage device in an ODD is to reduce costs and maintain the function of each storage device.

SUMMARY OF THE INVENTION

The following description provides a hybrid storage device that may reduce costs and may maintain the function of each storage device, and an electronic system using the hybrid storage device. In one general aspect, a hybrid storage device is provided. The hybrid storage device includes a first storage part that comprises an interface device based on a first standard, a second storage part that comprises an interface device based on a second standard, and a connector for interface devices that is shared by the first storage part and the second storage part and comprises a plurality of pins.

The interface device of the first storage part may be connected to some of the plurality of pins of the connector, and the interface device of the second storage part may be connected to remaining ones of the plurality of pins of the connector.

The connector for interface devices may include a power supply pin, and power lines of the interface device of the first standard and the interface device of the second standard may be commonly connected to the power supply pin.

The second storage part may be a solid-state storage device comprising a semiconductor memory.

The first storage part may be a solid-state storage device comprising a semiconductor memory.

In another aspect, a hybrid optical storage device is provided. The hybrid optical storage device includes a first storage part that comprises a serial advanced technology attachment (SATA) interface device and optically stores information, a second storage part that comprises a universal serial bus (USB) interface device, and a SATA interface connector that is shared by the first storage part and the second storage part and comprises a plurality of pins.

The first storage part may be an optical disc drive, and the second storage part may be a solid-state storage device.

In the interface connector, a manufacturing diagnostic pin and a device present pin defined in the SATA standard may be used as D+ and D− line pins defined in the USB standard.

In the interface connector, a manufacturing diagnostic pin and a device present pin defined in the SATA standard may be used as D+ and D− line pins defined in the USB standard.

Power lines of the SATA interface device and the USB interface device may be commonly connected to a power supply pin in the SATA interface connector.

Power lines of the SATA interface device and the USB interface device may be commonly connected to a power supply pin in the SATA interface connector.

In yet another aspect, an electronic system is provided. The electronic system includes a hybrid storage device that includes a first storage part that includes an interface device based on a first standard, a second storage part that comprises an interface device based on a second standard, and a slave connector for interface devices that is shared by the first storage part and the second storage part and comprises a plurality of pins, a host connector that corresponds to the slave connector for interface devices, and a driving unit that drives the first storage part and the second storage part.

The interface device based on the first standard may be a USB interface device. The interface device based on the second standard may be a SATA interface device. The slave connector may be a SATA slave connector.

In the slave connector, a manufacturing diagnostic pin and a device present pin defined in the SATA standard may be used as D+ and D− line pins defined in the USB standard.

The slave connector for interface devices may include a power supply pin. Power lines of the interface device based on the first standard and the interface device based on the second standard may be commonly connected to the power supply pin.

Power lines of the interface device based on the SATA standard and the interface device based on the UBS may be commonly connected to a power supply pin in the slave connector based on the SATA standard.

Power lines of the interface device based on the SATA standard and the interface device based on the USB standard may be commonly connected to a power supply pin in the slave connector based on the SATA standard.

The second storage part may be a solid-state storage device comprising a semiconductor memory.

The second storage part may be a solid-state storage device comprising a semiconductor memory.

In yet another aspect, a hybrid storage device is provided. The hybrid storage device includes a first storage part that comprises an interface device based on a first standard, a second storage part that comprises an interface device based on a second standard, and a connector being a single connector configured to connect to the first storage part and the second storage part via a plurality of pins. A portion of the pins are commonly connected with the first and second storage parts.

The connector may be connected to a printed circuit board. The portion of pins may include a ground pin and a power supply pin.

Other features and aspects may be apparent from the following detailed description, the drawings, and the claims.

Figure 1:
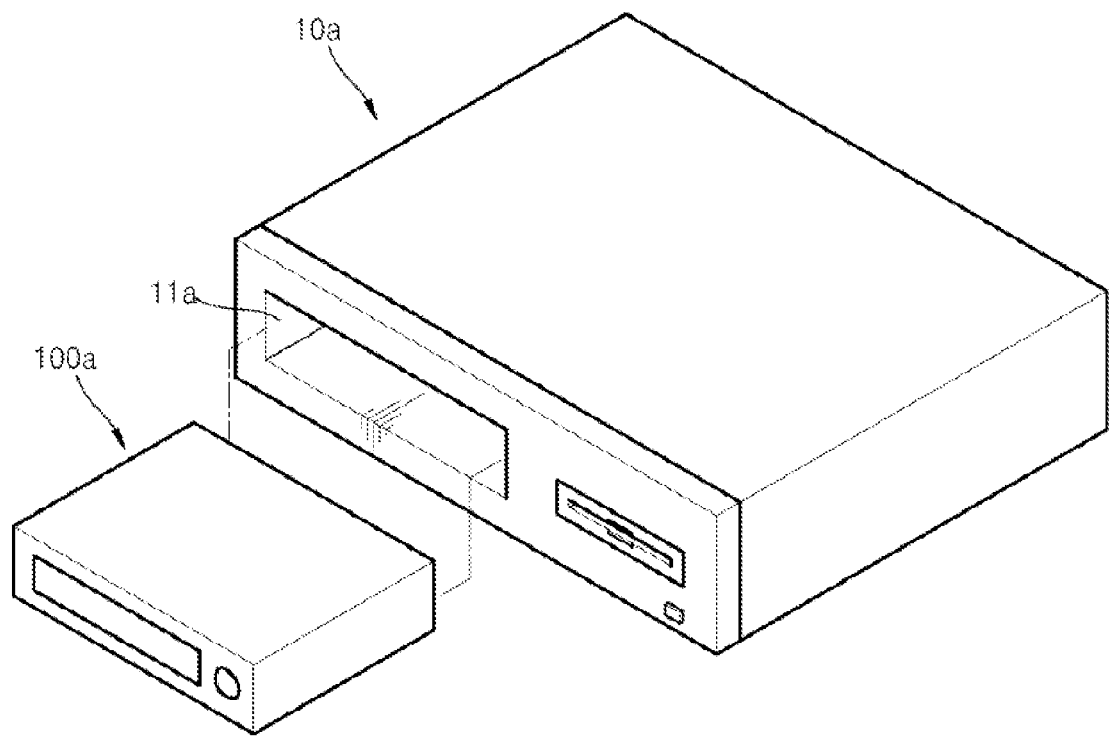
FIGS. 1 and 2 are views illustrating examples of a desktop computer and a notebook computer which are electronic systems using hybrid storage devices.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION OF THE INVENTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The following description will now be described with reference to the accompanying drawings. Although an example of an optical disc drive (ODD) is used as a first storage device, the example is not limited thereto, and, for example, a solid-state storage device such as a magnetic storage device or a semiconductor memory may be used as a first storage device, instead.

Figure 2:
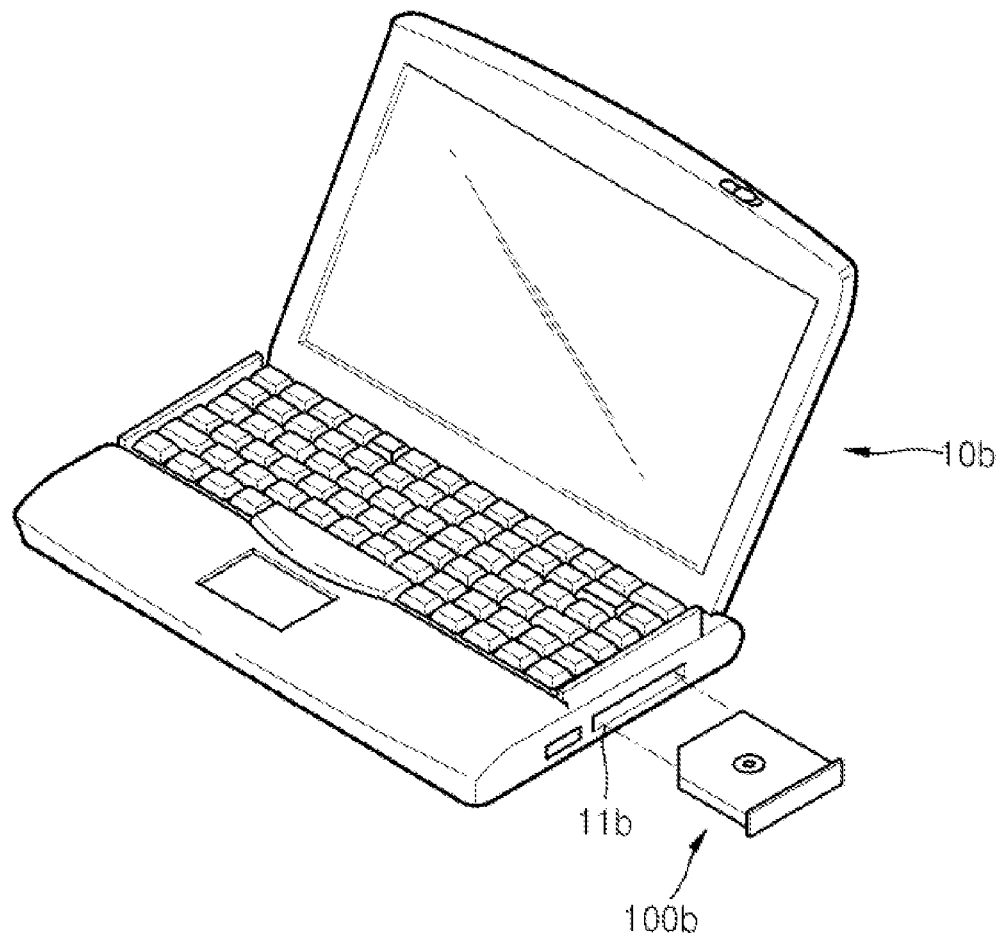

FIGS. 1 and 2 illustrate examples of a desktop computer 10a and a notebook computer 10b which are electronic systems including hybrid storage devices 100a and 100b, for example hybrid ODDs. Drive bays 11a and 11b are respectively secured in the desktop computer 10a and the notebook computer 10b, and the hybrid storage devices 100a and 100b are inserted into the drive bays 11a and 11b, respectively.

The hybrid storage devices 100a and 100b may be connected to host devices such as the desktop computers 10a and the notebook computer 10b via interface cables (not shown) for transmitting signals. Examples of the host devices include computers having driving units for driving or controlling the hybrid storage devices 100a and 100b, and any electronic systems in which the hybrid storage devices 100a and 100b are installed. Meanwhile, an interface (slave) connector may be a serial advanced technology attachment (SATA) connector. The following example uses a SATA interface (slave) connector.

Figure 3:
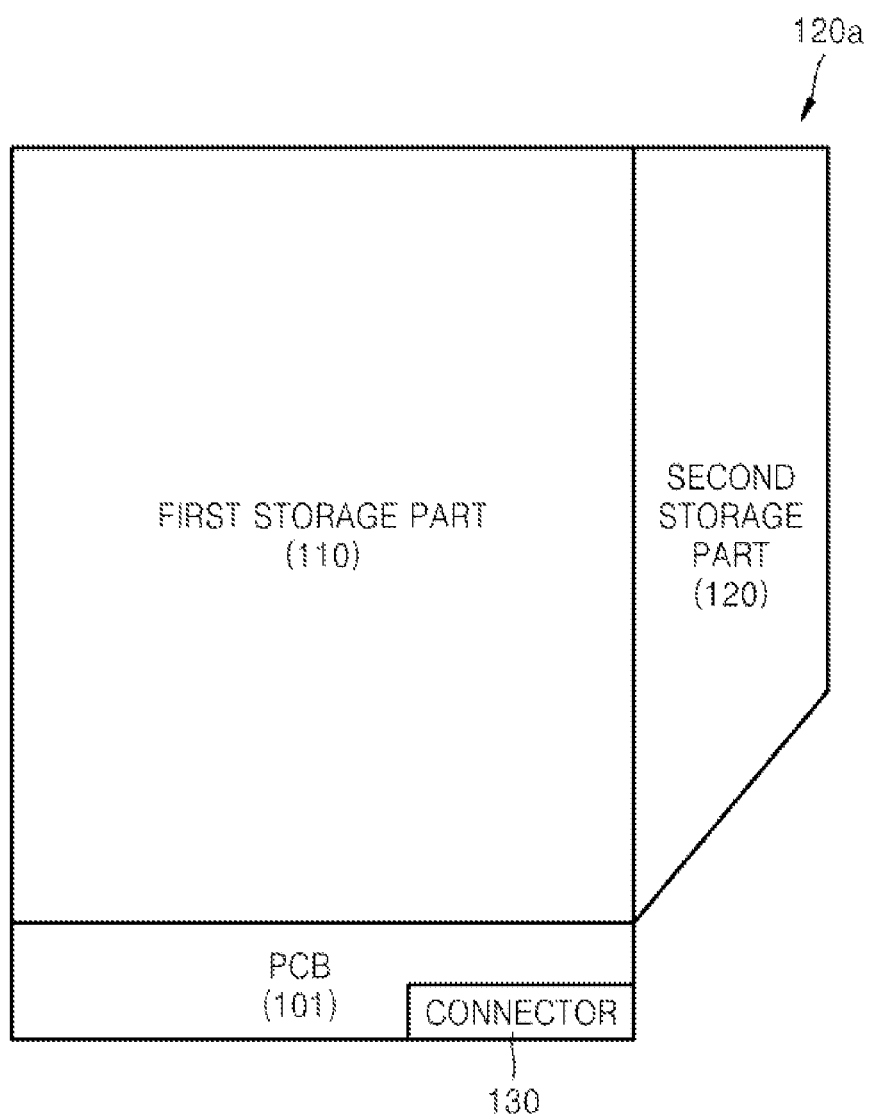
FIG. 3 is a diagram illustrating an example of a hybrid storage device.

As shown in FIG. 3, each of the hybrid storage devices 100a and 100b includes a first storage part 110 such as an ODD and a second storage part 120 that is a non-optical storage part 120 that may be a solid-state storage device such as, for example, a solid state drive (SDD) or a flash memory. The first and second storage parts 110 and 120 include interface devices based on first and second standards. For example, the first storage part 110 includes a USB interface device (or structure), and the second storage part 120 includes a SATA interface device (or structure) based on a SATA standard. The first and second storage parts 110 and 120 including the interface devices based on different standards are connected to one interface connector 130 inserted into a printed circuit board (PCB) 101. Table 1 illustrates arrangements and functions of pins according to the SATA standard.

|  | PIN | FUNCTION |  | CABLED USAGE | BACKPLANE USAGE |
|---|---|---|---|---|---|
|  |  |  | Signal Segment Key |  |  |
| Signal Segment | S1 | Gnd |  | 1st mate | 1st mate |
|  | S2 | A+ | Differential signal pair from host controller. | 2nd mate | 2nd mate |
|  | S3 | A− |  | 2nd mate | 2nd mate |
|  | S4 | Gnd |  | 1st mate | 1st mate |
|  | S5 | B− | Differential signal pair to host controller. | 2nd mate | 2nd mate |
|  | S6 | B+ |  | 2nd mate | 2nd mate |
|  | S7 | Gnd |  | 1st mate | 1st mate |
|  |  |  | Signal Segment "L" Central Connector Gap Power Segment "L" |  |  |
| Power Segment | P1 | DP | Device Present | Last mate | Last mate |
|  | P2 | +5 V |  | 2nd mate | 2nd mate |
|  | P3 | +5 V |  | 2nd mate | 2nd mate |
|  | P4 | MD | Manufacturing Diagnostic | 2nd mate | 2nd mate |
|  | P5 | Gnd |  | 1st mate | 1st mate |
|  | P6 | Gnd |  | 1st mate | 1st mate |
|  |  |  | Power Segment Key |  |  |

Figure 4:
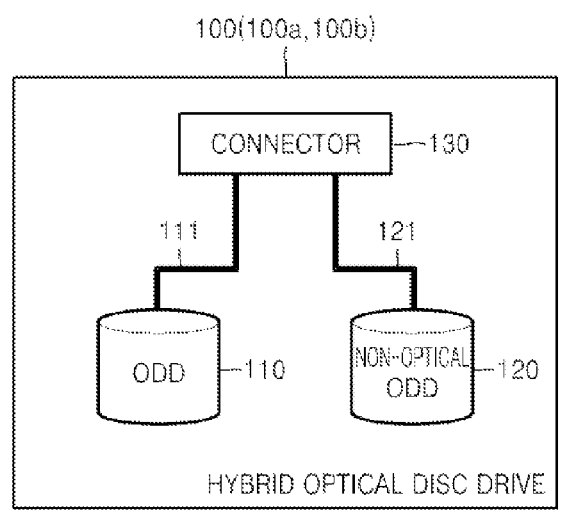
FIG. 4 is a diagram illustrating an example of a hybrid storage device.

The interface connector 130 is an interface port connected to an electronic system for driving a hybrid storage device, such as, for example, the desktop computer 10a or the notebook computer 10b. The interface connector 130 is shared by the first storage part 110 and the second storage part 120 as shown in FIG. 4. Since one connector 130 is shared by the first and second storage parts 110 and 120, in order for the interface devices not to interfere with each other, data lines are connected to independent pins, which will be explained with reference to FIG. 5.

Figure 5:
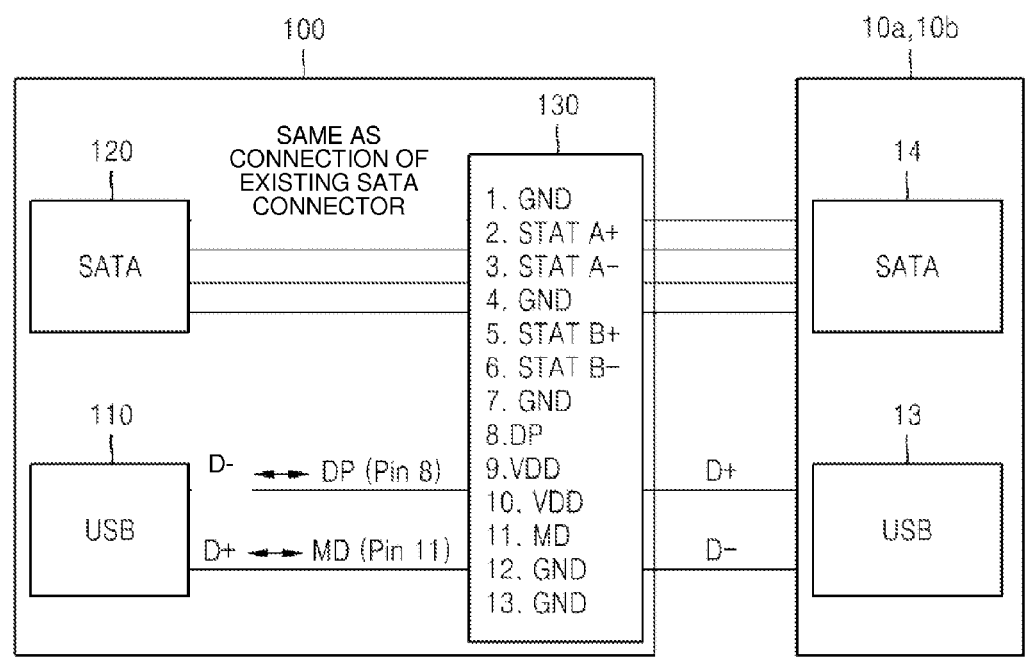
FIG. 5 is a diagram illustrating an example of an electronic system.

Referring to FIG. 5, in the interface connector 130, the first storage part 110 uses a device present (DP) pin, that is, an eighth pin, and a manufacturing diagnostic (MD) pin, that is, an eleventh pin, in the SATA standard for corresponding with D− and D+ pins (second and third pins, respectively) in the USB standard. The second storage part 120 may be a non-optical storage part such as an SDD that uses pins other than the eighth pin and the eleventh pin used by the first storage part 110. Ground pins GNDs and power supply pins VDDs may be commonly shared. For reference, in the USB standard, a fourth pin is a ground pin GND, a first pin is a power supply pin $V_{BUS}$ (or VDD) of 5 volts, and third and second pins are D+ and D− data pins, respectively.

Meanwhile, the desktop computer 10a and the notebook computer 10b respectively include interface circuits, that is, a USB interface circuit 13 and a SATA interface circuit 14, corresponding to the first storage part 110 and the second storage part 120. In other words, different medium devices include independent interface devices, host devices for driving the different medium devices also include different interface circuits and host connectors, and ground and power supply pins are commonly shared and connected.

An interface connector commonly shared by hybrid storage devices may be an interface connector based on a standard defining pins that may not be necessary in a SATA standard. In the SATA standard, an MD pin is a pin used by an ODD manufacturer, and a DP pin is a pin for determining the existence of a medium device and may not be necessary for actually driving the medium device. However, since such a connection structure does not completely meet requirements of the SATA standard, the hybrid storage devices are suitable for host devices correspondingly designed as described above.

Since different storage devices may be combined into a hybrid storage device, some problems, such as structural complexity, high cost, and low speed which may occur in response to different connectors being used or in response to one or the same type of interface connector being used with a multiplier, may be reduced.

Since different types of medium devices using different connectors to share one connector without using a multiplier (chip) may be used to connect a plurality of medium devices, product prices may be reduced. Since two different types of medium devices are connected to each other by using an interlace without using a multiplier are enabled, some of the problems of high power consumption and low data transfer rate which may occur in response to a multiplier being used may be reduced. In other words, two different types of medium devices may be used at low cost without reducing their performances.

It is understood that various changes in form and details may be made therein without departing from the spirit and scope of the following description as defined by the following claims.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A hybrid storage device comprising:
a first storage part comprising an interface device based on a first standard;
a second storage part comprising an interface device based on a second standard; and
a connector for interface devices configured to be shared by the first storage part and the second storage part and comprises a plurality of pins,
wherein the connector comprises a power supply pin, and wherein power lines of the interface device of the first standard and the interface device of the second standard are commonly connected to the power supply pin, and
wherein, in the connector, a manufacturing diagnostic pin and a device present pin defined in the SATA standard are used as D+ and D− line pins defined in the USB standard.

2. The hybrid storage device of claim 1, wherein the interface device of the first storage part is connected to some of the plurality of pins of the connector, and the interface device of the second storage part is connected to remaining ones of the plurality of pins of the connector.

3. The hybrid storage device of claim 1, wherein the second storage part is a solid-state storage device comprising a semiconductor memory.

4. The hybrid storage device of claim 3, wherein the first storage part is a solid-state storage device comprising a semiconductor memory.

5. A hybrid optical storage device comprising:
a first storage part comprising a serial advanced technology attachment (SATA) interface device and optically stores information;
a second storage part comprising a universal serial bus (USB) interface device; and
a SATA interface connector configured to be shared by the first storage part and the second storage part and comprises a plurality of pins,
wherein power lines of the SATA interface device and the USB interface device are commonly connected to a power supply pin in the SATA interface connector, and
wherein, in the SATA interface connector, a manufacturing diagnostic pin and a device present pin defined in the SATA standard are used as D+ and D− line pins defined in the USB standard.

6. The hybrid optical storage device of claim 5, wherein the first storage part is an optical disc drive, and the second storage part is a solid-state storage device.

7. An electronic system comprising:
a hybrid storage device comprising:
a first storage part further comprising an interface device based on a first standard;
a second storage part further comprising an interface device based on a second standard; and
a slave connector for interface devices configured to be shared by the first storage part and the second storage part and comprises a plurality of pins;
a host connector configured to correspond to the slave connector for interface devices; and
a driving unit configured to drive the first storage part and the second storage part,
wherein the slave connector comprises a power supply pin, and
wherein power lines of the interface device based on the first standard and the interface device based on the second standard are commonly connected to the power supply pin, and
wherein, in the slave connector, a manufacturing diagnostic pin and a device present pin defined in the SATA standard are used as D+ and D− line pins defined in the USB standard.

8. The electronic system of claim 7, wherein the interface device based on the first standard is a USB interface device, the interface device based on the second standard is a SATA interface device, and the slave connector is a SATA slave connector.

9. The electronic system of claim 7, wherein the second storage part is a solid-state storage device comprising a semiconductor memory.

10. The electronic system of claim 8, wherein the second storage part is a solid-state storage device comprising a semiconductor memory.

11. The hybrid storage device of claim 1, wherein the connector is connected to a printed circuit board.

12. The hybrid storage device of claim 1, wherein the connector further comprises a ground pin commonly connected to the interface device of the first standard and the interface device of the second standard.

13. The hybrid optical storage device of claim 5, wherein the SATA interface connector further comprises a ground pin commonly connected to the SATA interface device and the USB interface device.

14. The hybrid optical storage device of claim 6, wherein the SATA interface connector further comprises a ground pin commonly connected to the SATA interface device and the USB interface device.

15. The electronic system of claim 7, wherein the slave connector further comprises a ground pin commonly connected to the interface device based on the first standard and the interface device based on the second standard.

16. The electronic system of claim 8, wherein the slave connector further comprises a ground pin commonly connected to the interface device based on the SATA standard and the interface device based on the USB standard.

17. The electronic system of claim 9, wherein the slave connector further comprises a ground pin commonly connected to the interface device based on the first standard and the interface device based on the second standard.

\* \* \* \* \*